J. F. Lorecraft,
Circular Sawing Machine.

N° 12,065.   Patented Dec. 12, 1854.

UNITED STATES PATENT OFFICE.

JOHN F. LOVECRAFT, OF ROCHESTER, NEW YORK.

FEED-MOTION FOR SAWING LIGHT LUMBER.

Specification of Letters Patent No. 12,065, dated December 12, 1854.

*To all whom it may concern:*

Figure 3:
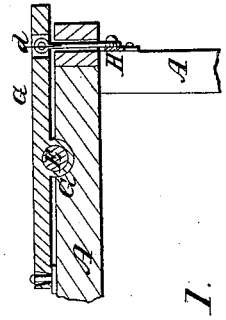
Figure 1:
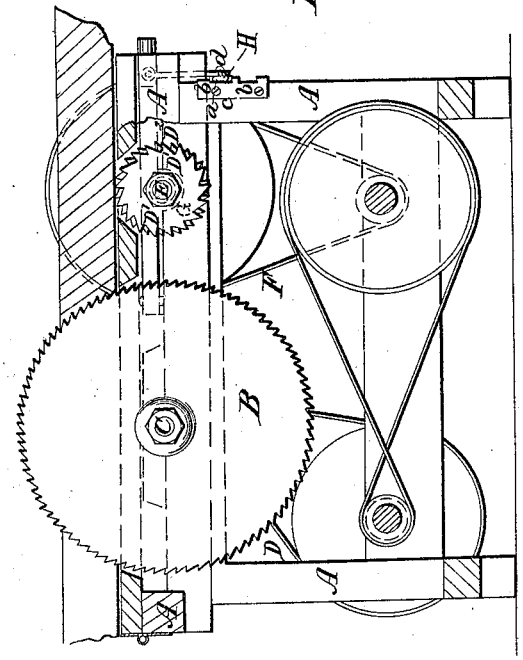
Figure 2:
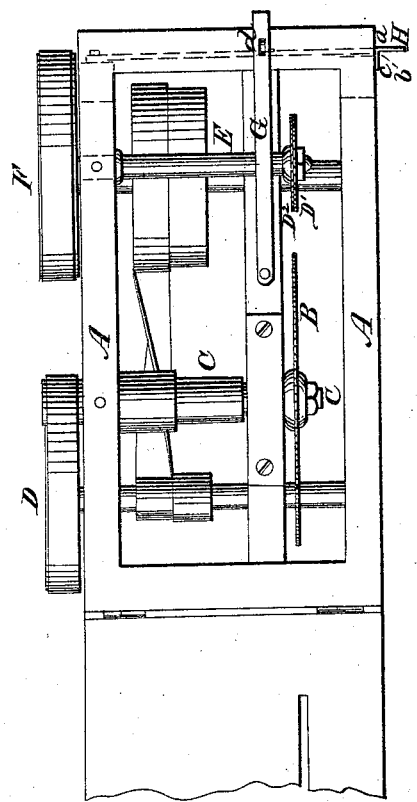

Be it known that I, J. F. LOVECRAFT, of Rochester, in the county of Monroe and State of New York, have invented a new and useful Improvement in Feed-Motions for Sawmills; and I do hereby declare that the following is a full, clear, and exact description of the same, reference being had to the accompanying drawings, forming part of this specification, in which—Figure 1, is a vertical longitudinal section through the line $x$, $x$, in Fig. 2. Fig. 2, is a plan or top view of the same, the hinged top being thrown off, or back. Fig. 3, is a broken section showing the arrangement for adjusting the feed motion.

Similar letters of reference in each of the several figures indicate corresponding parts.

This invention relates to a new and utile improvement in buzz and panel saw mills, whereby the stuff is perfectly fed to the saw or saws, the saw mill greatly simplified, the trouble and labor of managing and keeping it in order lessened, and withal the cost of construction considerably reduced.

The nature of my invention consists in the employment, for the purpose of feeding board to saws, of two or more small saws which have hook or other suitable shaped teeth, and are so united and arranged that the teeth of one will come opposite the spaces between the teeth of the other, and both can be adjusted so as to be thrown in and out of operation in an instant. The teeth of these saws entering the bottom of the board, and as the feed saws revolve, feeding it to the cutting saw. And as two saws are employed, and the teeth of one saw come opposite the spaces of the other, the board is held more firmly, and the liability of the wood breaking away, as when a single fine saw is employed, is greatly lessened.

To enable others skilled in the art to make and use my invention, I will proceed to describe its construction and operation.

A, represents the frame of the machine made of wood and of oblong or other suitable shape; its top is hinged as represented, so that it may be thrown up or back when it is desired.

B, is a buzz saw, hung on the arbor C, in the usual manner, and made to revolve rapidly by the band D.

D′, D², are the small feed saws; they are so arranged and united together that the teeth of D′, come opposite the spaces of D², as shown in the drawing. The saws, by being thus arranged, are capable of biting more firmly on the wood, and the wood is not so liable to be torn away, owing to the teeth of one saw biting out of line with the teeth of the other saw. If these saws are set so as to have their teeth bite in the same transverse line, it must be obvious that the wood is more liable to give way and the feed saws lose their hold. The saws D′, D², are hung on the arbor E, which is caused to revolve slowly by the band F;—one of its ends is hung in an adjustable hinged bearing G, and is adjusted as described, by the lever H, which is connected to it by the rod, $d$, as shown in the drawing—its other end being left free to play in its bearing as the first named end is raised and lowered by the lever H. The lever H, which operates upon the bearing G, is so arranged, that its end, $a$, fits over the stops $b$, formed on the bar $c$, and hold the bearing G, in place when properly adjusted. These notches allow of the saws being raised higher when it is desired to have them take a strong hold, or allow of them being depressed when it is not desirable or prudent to have the saws enter the wood to so great a depth. By this lever the saws can be depressed sufficiently far below the top of the saw mill to allow of the table or top being used for other purposes.

This feed motion is represented as applied to a buzz saw, but I do not intend to limit myself to its application to this particular kind of saw, as it can be applied with the same advantage to panel saws, as may be obvious.

In the drawing, the machine is represented as in operation, the board being shown by red lines, and the teeth of the feed saws are shown performing their duty, they having taken a firm hold into the board.

What I claim as my invention and desire to secure by Letters Patent, is:—

The feed motion for saw mills herein described and shown in the drawing, said feed motion consisting of two or more small saws D′, D², so united together that the teeth of one come opposite the spaces of the other, and so arranged that they can be adjusted so as to be caused to enter the board to a greater or less depth, as desired, or to be entirely out of the way when the table is being used for a different purpose, substantially as herein described.

JOHN F. LOVECRAFT.

Witnesses:
HUGH DORSEY,
BENJAMIN ROBINSON.